(12) United States Patent
Ko

(10) Patent No.: US 6,343,060 B1
(45) Date of Patent: *Jan. 29, 2002

(54) OPTICAL DISK HAVING RECORDING LAYERS OF DIFFERENT REPRODUCTION STANDARDS

(75) Inventor: Jung-Wan Ko, Kwonson-gu (KR)

(73) Assignee: Samsung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/098,619

(22) Filed: Jun. 17, 1998

(30) Foreign Application Priority Data

Jun. 18, 1997 (KR) .............................. 97-25365

(51) Int. Cl.[7] .................................. G11B 7/24
(52) U.S. Cl. ...................... 369/275.1; 369/94
(58) Field of Search .................. 369/33, 58, 54, 369/116, 44.26, 44.37, 275.1, 94, 275.2, 112, 110, 109, 275.3, 275.4, 13, 283, 284, 286; 428/64.1, 64.4

(56) References Cited

U.S. PATENT DOCUMENTS

| | | | | |
|---|---|---|---|---|
| 5,513,164 A | * | 4/1996 | Tanaka et al | 369/112 |
| 5,540,966 A | * | 7/1996 | Hintz | 428/64.1 |
| 5,696,754 A | * | 12/1997 | Nishizawa | 369/275.1 |
| 5,708,652 A | * | 1/1998 | Ohki et al. | 369/275.1 |
| 5,708,653 A | * | 1/1998 | Okada et al. | 369/275.1 |
| 5,732,065 A | * | 3/1998 | Braat et al | 369/275.1 |
| 5,859,822 A | * | 1/1999 | Inoue et al. | 369/58 |
| 5,876,823 A | * | 3/1999 | Nagashima | 428/64.1 |
| 5,883,877 A | * | 3/1999 | Nishizawa | 369/257.1 |
| 5,923,625 A | * | 7/1999 | Shimazaki et al | 369/13 |
| 5,959,961 A | * | 9/1999 | Matsui | 369/275.1 |
| 6,111,851 A | * | 8/2000 | Ohki et al. | 369/286 |

* cited by examiner

*Primary Examiner*—Ali Neyzari
(74) *Attorney, Agent, or Firm*—Staas & Halsey LLP

(57) ABSTRACT

An optical disk includes a first recording layer for recording data reproducible only by an optical disk reproducing device using light of a wavelength based on a first standard, and a second recording layer for recording data reproducible only by an optical disk reproducing device using light of a wavelength based on a second standard different from the first standard.

20 Claims, 5 Drawing Sheets

OPTICAL DISK HAVING RECORDING LAYERS OF DIFFERENT REPRODUCTION STANDARDS

BACKGROUND OF THE INVENTION

1. Field of the Invention

The present invention relates to an optical information recording medium, and in particular, to a multilayered optical disk.

2. Description of the Related Art

An optical disk, which is one kind of optical information recording media, is widely used to record and reproduce various data including audio and video data. Such optical disks include a compact disk (CD), a digital video disk (DVD), a laser disk (LD), and a mini disk (MD). Among them, the CD is a major optical disk which has widely been used so far, and the DVD has recently emerged. The DVD is expected to find wide use as a next generation recording medium for recording and reproducing video and audio data because it can accommodate 17-GB data at a maximum, enough to store one movie on a single disk, using high-density digital compression technology, though it is only as large as a conventional CD, provides higher image quality than the LD, and allows simultaneous dubbing of a plurality of languages for a movie to be appreciated in a selected language.

Meanwhile, CDs and their reproducing devices are widely used in audio systems, whereas DVDs and their reproducing devices have just started to be provided. Hence, the CDs will be more popular than the DVDs at least for the time being. In this context, it is preferable to fabricate a DVD which can be compatibly reproduced in both CD and DVD reproducing devices.

However, CD and DVD systems differ in standard (format), wavelength of light used for reproducing data, and mechanical mechanisms. That is, light sources as provided in CD and DVD standards are a 780 nm infrared laser and a 680–635 nm red laser, respectively. Besides, a CD is 1.2 mm thick, while a dual DVD currently used is a stack of two 0.6 mm-thick disks with their respective recording layers attached to each other to allow recording and reproduction of data on and from both surfaces.

As described above, a single optical disk cannot accommodate both types of data separately reproducible in a conventional CD reproducing device and a DVD reproducing device.

Therefore, due to its inability of satisfying different standards of reproducing devices, the optical disk cannot be used concurrently and compatibly for different purposes. The same problem is encountered when different light sources or mechanical mechanisms are used for different standards.

SUMMARY OF THE INVENTION

Accordingly, an object of the present invention is to provide an optical disk satisfying different standards.

Additional objects and advantages of the invention will be set forth in part in the description which follows and, in part, will be obvious from the description, or may be learned by practice of the invention.

To achieve the above and other objects of the present invention, there is provided an optical disk. The optical disk includes a first recording layer for recording data reproducible only by an optical disk reproducing device using light of a wavelength based on a first standard, and a second recording layer for recording data reproducible only by an optical disk reproducing device using light of a wavelength based on a second standard different from the first standard.

The feature of the present invention lies in the fact that an optical disk has a first recording layer and a second recording layer for recording data reproducible only in a first standard wavelength using a first type of optical disk reproducing system and in a second standard wavelength using a second type of optical disk reproducing system, respectively.

For this purpose, first and second disks are prepared, with a total thickness of both disks attached to each other set according to a first standard, and a thickness of the second disk set according to a second standard.

The first disk includes a recording layer formed according to the first standard, and a selective reflection layer with a high reflectance for light of a first standard wavelength and a high absorptance for light of a second standard wavelength. On the other hand, the second disk includes a recording layer formed according to the second standard, and a semi-transmission film with a high transmittance for the light of the first standard wavelength and a reflectance as provided by the second standard for the light of the second standard wavelength. A surface of the first disk, opposite to that of the selective reflection layer, is attached to the semi-transmission surface of the second disk having the semi-transmission film by a transparent adhesive, so that a total thickness of both disks is set according to the first standard.

In this disk structure, a first standard optical disk reproducing device can reproduce data recorded according to the first standard by reflecting a first standard laser beam from the selective reflection layer of the first disk. On the contrary, a second standard optical disk reproducing device can reproduce data recorded according to the second standard by reflecting a second standard laser beam from the semi-transmission film of the second disk.

Thus, data supporting a plurality of standards are recorded in different recording layers, and produced by corresponding standard optical disk reproducing devices.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENT

Figure 1:
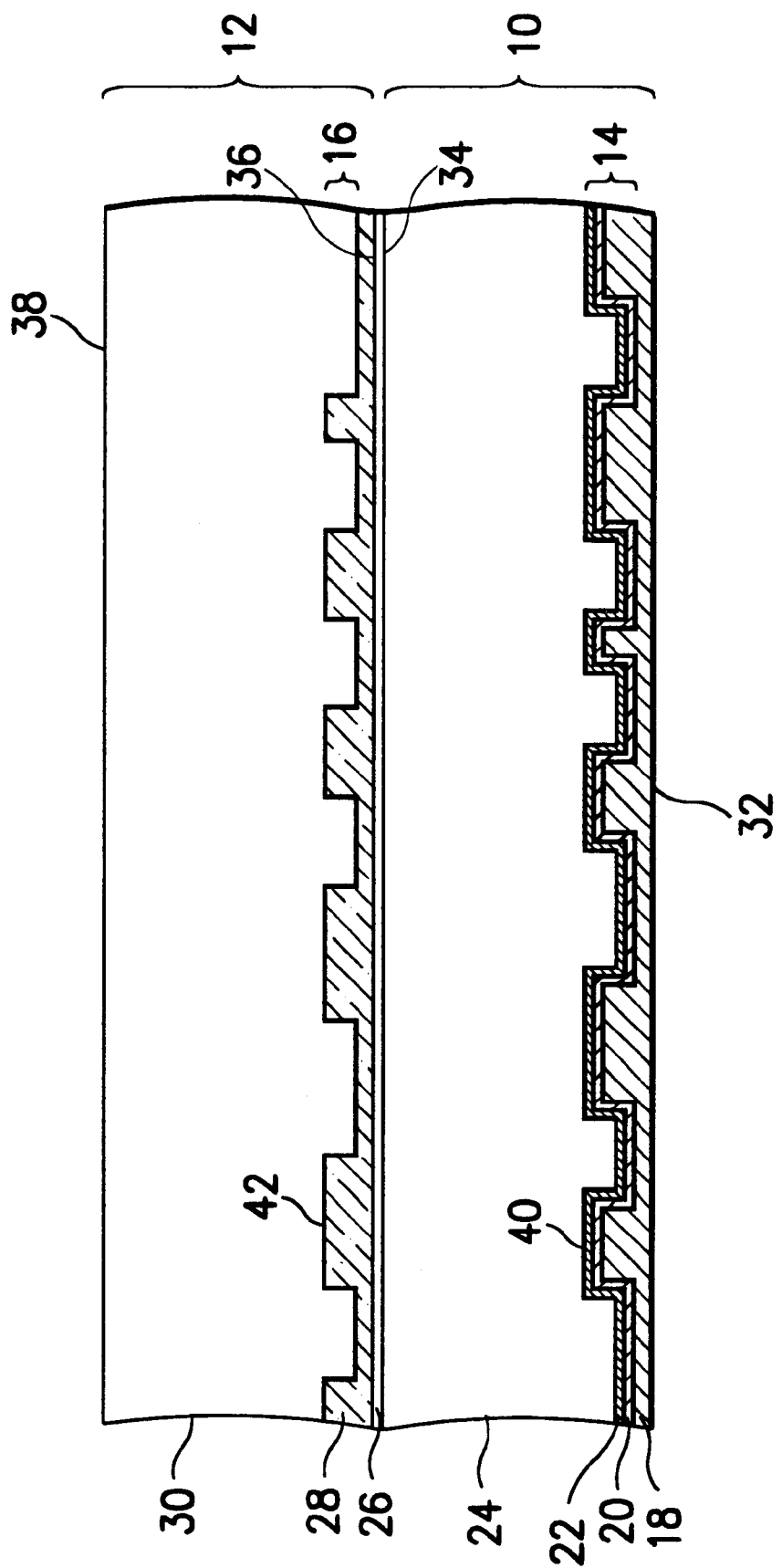
FIG. 1 is a schematic sectional view of an optical disk according to an embodiment of the present invention.

An embodiment of the present invention will be described in detail, and it should be noted that like reference numerals denote the same components, and a detailed description of known function and structure of the present invention will be avoided if it is deemed to obscure the subject matter of the present invention.

For description of the present invention, CD and dual-DVD standards (formats) are exemplarily used as first and second standards, respectively. In this case, a CD standard laser wavelength is 780 nm, and a DVD standard laser wavelength is 680–635 nm, and mainly 650 nm.

FIG. 1 is a schematic sectional view of an optical disk according to an embodiment of the present invention, not on an accurate scale. The optical disk of FIG. 1 is fabricated by attaching a first disk 10 having a first recording layer 14 for recording CD standard data on a surface thereof to a second disk 12 having a second recording layer 16 for recording DVD standard data on a surface thereof by a connection layer 26 formed of a light transmissive adhesive. A first surface 34 of the first disk 10, opposite to that of the first recording layer 14, is connected to a first surface 36, having the second recording layer 16, of the second disk 12. For convenience sake, a second surface 32, having the first recording layer 14, and the other surface 34 of the first disk 10 are referred to as "a protection surface 32" and "the first connection surface 34," respectively. The first surface 36 and the second surface 38, opposite to that of the second recording layer 16, of the second disk 12 are referred to as "the second connection surface 36" and "a reproduction surface 38," respectively. A laser beam for reproducing data from the first and second recording layers 14 and 16 is incident on the reproduction surface 38. The thickness of the second disk 12 is 0.6 mm according to the DVD standard, and the total thickness of the first and second disks 10 and 12 is 1.2 mm according to the CD standard.

In the first disk 10, the first recording layer 14 includes a first data pit pattern 40, an organic pigment layer 22, and a reflection film 20 on a protection film 18 of a surface of a first transparent substrate 24. The first data pit pattern 40 is produced by recording the CD standard data. The organic pigment layer 22 and the reflection film 20 under the first data pit pattern 40 act as a selective reflection layer having a high reflectance for a 780 nm infrared laser beam and a high absorptance for a near-650 nm red laser beam. For example, a reflection film in a conventional CD-R (Compact Disk Recordable), in which a user can write data once, has the same characteristics, and it is widely known that those skilled in the art can easily find such a disk.

Figure 4:
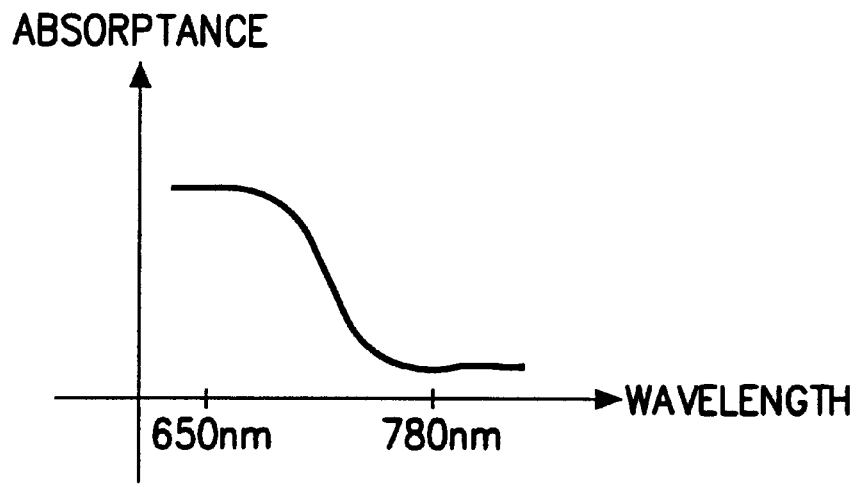
FIG. 4 is a graph showing an optical absorption characteristic of an organic pigment layer shown in FIG. 1.
Figure 5:
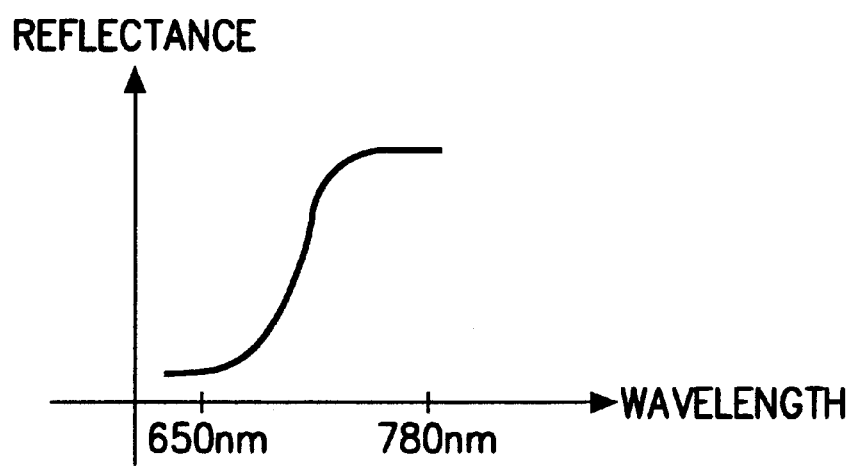
FIG. 5 is a graph showing an optical reflection characteristic of the organic pigment layer and a reflection film shown in FIG. 1.

As shown in FIG. 1, to constitute the selective reflection layer of the organic pigment layer 22 and the reflection film 20, the organic pigment layer 22 is formed of a composition, such as a cyanine-type dye, having a low absorptance for the 780 nm laser beam and a high absorptance for the near-650 nm laser beam. The reflection film 20 is formed of aluminum or gold, as in a conventional CD. Thus, the optical absorption characteristic of the selective reflection layer having the organic pigment layer 22 and the reflection film 20 becomes similar or the same to that of the organic pigment layer 22 shown in FIG. 4, and the optical reflection characteristic of the selective reflection layer is shown in FIG. 5.

Figure 2:
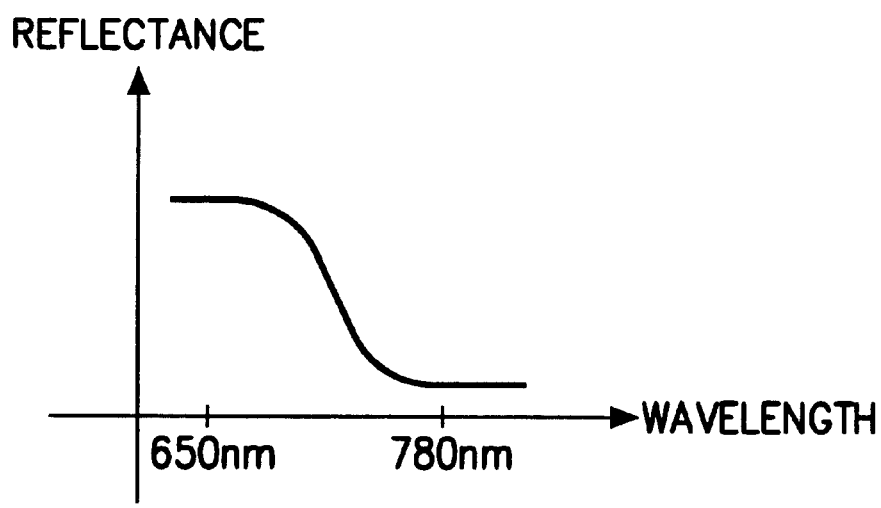
FIG. 2 is a graph showing an optical reflection characteristic of a semi-transmission film shown in FIG. 1.
Figure 3:
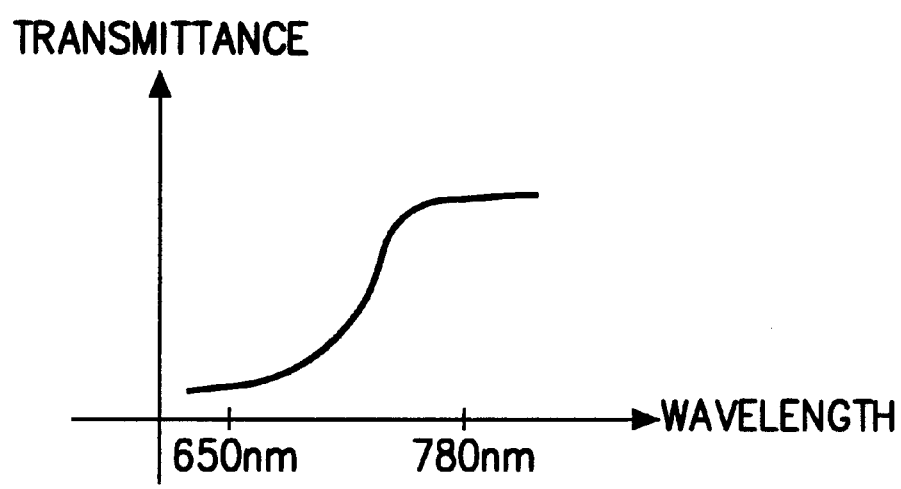
FIG. 3 is a graph showing an optical transmission characteristic of the semi-transmission film shown in FIG. 1.

In the second disk 12, the second recording layer 16 includes a second data pit pattern 42 and a semi-transmission film 28 on a surface of a second transparent substrate 30. The second data pit pattern 42 is produced by recording DVD standard data. The semi-transmission film 28 between the second data pit pattern 42 and the connection layer 26 has a high transmittance for the 780 nm laser beam and a reflectance as provided by the DVD standard, for the near-650 nm laser beam. It is well-known to those skilled in the art that the above characteristics can be obtained by use of a dielectric film having a reflectance of 18–30% in a general dual DVD as the semi-transmission film 28 of the second disk 12. The dielectric is a silicon nitride (SiN), for example. The optical reflection and transmission characteristics of the semi-transmission film 28 are shown in FIGS. 2 and 3, respectively.

The first and second disks 10 and 12 as constituted above are connected to each other by an adhesive, with the first connection surface 34 of the first disk 10 facing the second connection surface 36 of the second disk 12, and the total thickness of the first and second disks 10 and 12 is set to 1.2 mm.

Figure 6:
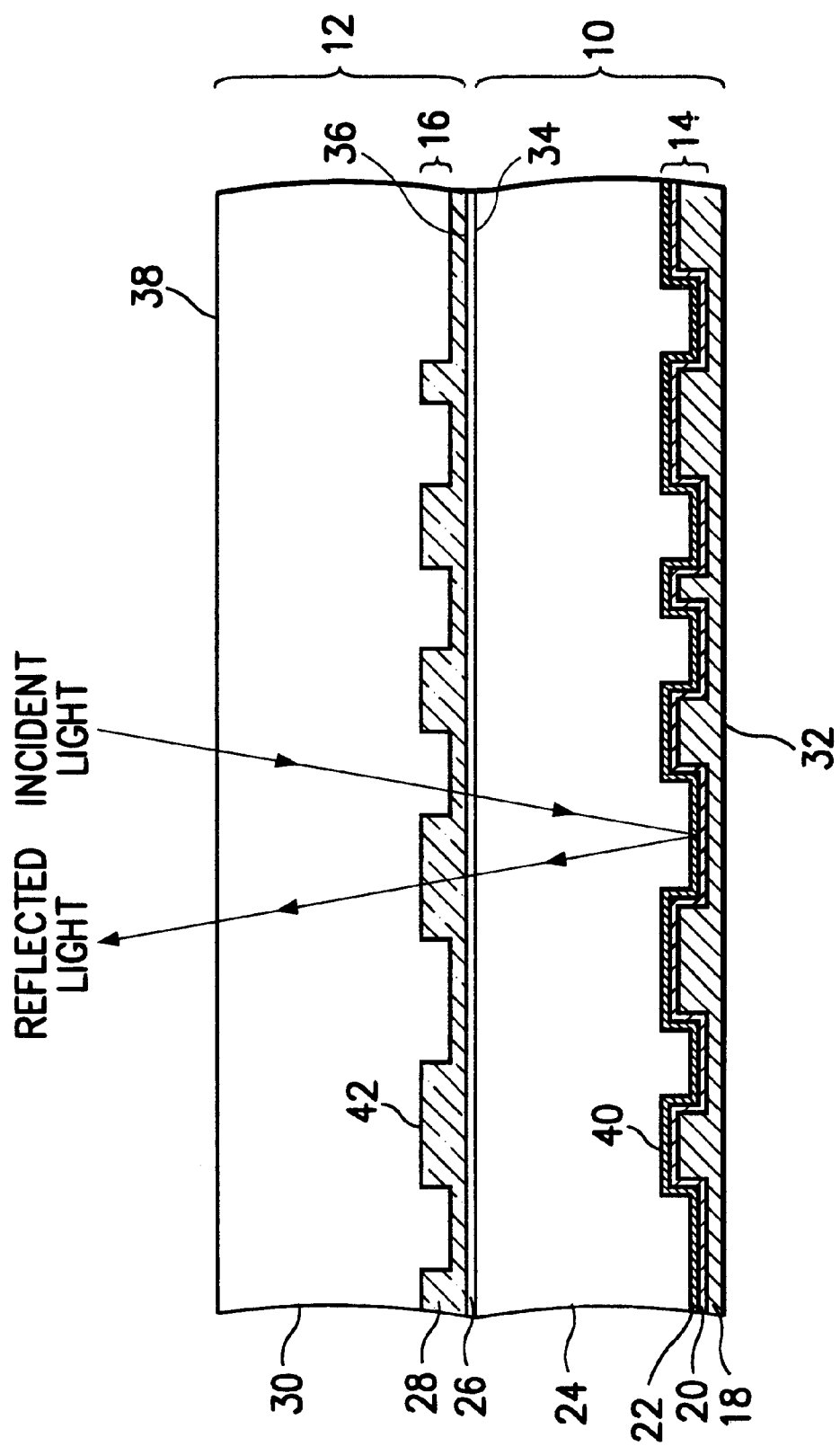
FIG. 6 is an exemplary view of light reflection and transmission when reproducing the optical disk shown in FIG. 1 in accordance with the CD standard.

FIG. 6 illustrates light transmission and reflection when the thus-obtained optical disk is reproduced by a CD reproducing device using a 780 nm laser. Optical paths of incident light and reflected light are distinguished for a better understanding of the present invention, but depend on an optical system of the CD reproducing device in an actual situation. As shown in FIG. 6, a 780 nm laser light incident on the reproduction surface 38 is sequentially transmitted through the second transparent substrate 30, the semi-transmission film 28, the connection layer 26, the first transparent substrate 24, and the organic pigment layer 22, and reflected from the reflection film 20. The reflected light returns through the organic pigment layer 22, the first transparent substrate 24, the connection layer 26, the semi-transmission film 28, and the second transparent substrate 30, in reverse order to that of the incident light. Thus, the optical disk can be reproduced by the conventional CD reproducing device, in effect as a conventional CD having a reflection film formed on a 1.2-mm thick transparent substrate therein.

Figure 7:
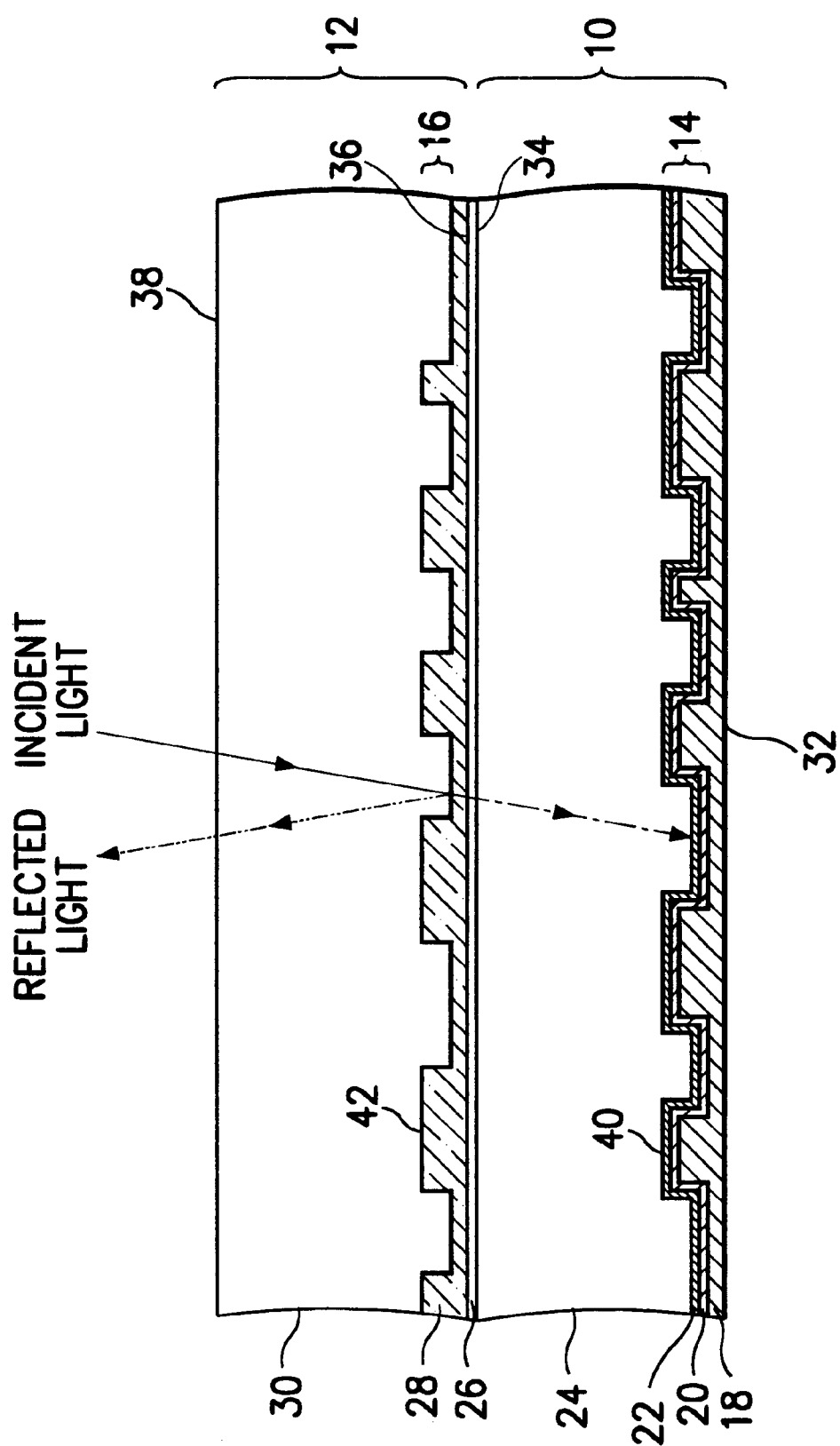
FIG. 7 is an exemplary view of light reflection and transmission when reproducing the optical disk shown in FIG. 1 in accordance with the DVD standard.

On the other hand, FIG. 7 illustrates light transmission and reflection when the optical disk is reproduced by a DVD reproducing device using a 650 nm laser. Optical paths of incident light and reflected light are distinguished for a better understanding of the present invention, but depend on an optical system of the DVD reproducing device in an actual situation. As shown in FIG. 7, a 650 nm laser light impinges on the reproduction surface 38, is transmitted through the second transparent substrate 30, and is reflected from the semi-transmission film 28 by only 18–30%. The other non-reflected light is transmitted through the connection layer 26 and the first transparent substrate 24, and then absorbed in the organic pigment layer 22. Thus, only 18–30% of the incident light is reflected. Because the 18–30% reflectance corresponds to that of a dual DVD, the optical disk can be reproduced by applying the same optical amplification factor as in reproducing a dual DVD. In addition, the distance between the reproduction surface 38 and the second recording layer 16 is 0.6 mm, which also contributes to reproduction of the optical disk by the DVD reproducing device.

To reproduce identical music from a single optical disk according to the embodiment of the present invention by both CD and DVD standard reproducing devices, digital data sampled in a sampling frequency of 44.1 kHz is recorded as a first music signal, reproducible by the CD standard reproducing device, on a CD surface of the optical disk, and digital data sampled at a frequency of more than 44.1 KHz, i.e., 88.2 or 192 KHz, and/or the sampled music having a greater resolution such as 20 or 24 bits instead of 16 bits, is recorded as a high-quality second music signal on the DVD surface thereof, reproducible by the DVD standard reproducing device.

Instead of being reproducible by 635 nm–680 nm and 780 nm standard laser wavelengths, the optical disk may be compatible with other standard wavelengths. For example, the longer standard laser wavelength may be 635–680 nm and the shorter standard laser wavelength may be less than 600 nm.

As described above, since a single optical disk satisfies a plurality of standards, it can be reproduced selectively by different standards-based optical disk reproducing devices.

While the present invention has been described with reference to the specific embodiment, many variations can be made by anyone skilled in the art within the scope and spirit of the present invention. Even though an optical disk satisfying the CD and DVD standards is disclosed in the embodiment of the present invention, it can be extended to a plurality of standards as far as it basically has the same structure. That is, if such conditions as the wavelengths of light used, the thickness of an optical disk, data pit patterns, and the number of layers are varied, a selective reflection layer and a semi-transmission film may be formed in compliance with the varied conditions. In this case, materials for the selective reflection layer and the semi-transmission film are varied with wavelengths. Thus, the appropriate scope hereof is deemed to be in accordance with the claims as set forth below.

What is claimed is:

1. An optical disk comprising:
a first recording layer to record data reproducible only by a first type of optical disk reproducing device using a first light of a first wavelength based on a first format;
a second recording layer to record data reproducible only by a second type of optical disk reproducing device using a second light of a second wavelength based on a second format different from the first format;
a reproduction surface on which a light to reproduce the data of the first type or second type of optical disk reproducing device and incident to the optical disk first impinges, wherein a first distance between the reproduction surface and the second recording layer is based on the second format, and a second distance between the reproduction surface and the first recording layer is based on the first format; and
a selective reflection layer adjacent to the first recording layer, and having a high reflectance for the first light of the first wavelength based on the first format and a high absorptance for the second light of the second wavelength based on a second format different from the first format.

2. An optical disk comprising:
a first disk having a first transparent substrate and a first recording layer formed on a first surface of the first transparent substrate, to reflect a first light of a first wavelength based on a first format and absorb a second light of a second wavelength based on a second format different from the first format, to record first format data therein; and
a second disk having a second transparent substrate and a second recording layer formed on a surface of the second transparent substrate, to transmit the first light and reflect the second light at a reflectance set by the second format, to record second format data therein,
wherein the first disk has a second surface opposite to that of the first surface thereof, the second disk has a surface having the second recording layer, and the second surface of the first disk is connected to the surface having the second recording layer of the second disk in a light transmissive manner.

3. The optical disk as claimed in claim 2, wherein the first light is a 780 nm laser beam, and the second light is a laser beam between 680 nm and 635 nm.

4. The optical disk as claimed in claim 2, wherein the first format is a CD (Compact disk) format, and the second format is a DVD (Digital Video disk) format.

5. The optical disk as claimed in claim 2, wherein the first light is between 680 nm and 635 nm, and the second light is shorter than 600 nm.

6. An optical disk comprising:
a first transparent substrate having a first surface on which a first data pit pattern of first data of a first format is formed;
a selective reflection layer adjacent to the first data pit pattern, and having a high reflectance for a first light of a first wavelength based on the first format and a high absorptance for a second light of a second wavelength based on a second format different from the first format;
a second transparent substrate having a surface on which a second data pit pattern of second data of the second format is formed;
a semi-transmission film disposed between a second surface of the first transparent substrate opposite the first surface thereof and the second data pit pattern, and having a high transmittance for the first light and a reflectance determined by the second format for the second light; and
a connection layer to connect the second surface of the first transparent substrate to the surface of the second transparent substrate in a light transmissive manner.

7. The optical disk as claimed in claim 6, wherein the selective reflection layer comprises:
a reflection film to reflect the first light; and
an organic pigment layer disposed between the reflection film and the first data pit pattern, and having a high absorptance for the second light.

8. The optical disk as claimed in claim 7, wherein the semi-transmission film is a dielectric film.

9. The optical disk as claimed in claim 6, further comprising a protection film adjacent to the reflection film.

10. The optical disk as claimed in claim 9, wherein a total thickness of the semi-transmission film and the second transparent substrate is set based on the second format, and a total thickness of the protection film, the selective reflection layer, the first transparent substrate, the semi-transmission film, and the second transparent substrate is set based on the first format.

11. The optical disk as claimed in claim 10, wherein the total thickness based on the first format is 1.2 mm, and the total thickness based on second format is 0.6 mm.

12. The optical disk as claimed in claim 10, wherein the first light is a 780 nm laser beam, and the second light is a laser beam between 680 nm and 635 nm.

13. The optical disk as claimed in claim 10, wherein the first format is a CD (Compact disk) format, and the second format is a DVD (Digital Video disk) format.

14. The optical disk as claimed in claim 10, wherein the first light is between 680 nm and 635 nm, and the second light is shorter than 600 mn.

15. The optical disk as claimed in claim 6, wherein the reflectance by the semi-transmission film of the first light is between 18 and 30%.

16. The optical disk as claimed in claim 7, wherein the organic pigment layer is a cyanine-type dye.

17. The optical disk as claimed in claim 7, wherein the reflection film is formed of aluminum or gold.

18. The optical disk as claimed in claim 17, wherein the reflection film is formed of aluminum or gold.

19. The optical disk as claimed in claim 8, wherein the dielectric film is formed of silicon nitride (SiN).

20. An optical disk comprising:

a first recording layer compatible with a first format;

a second recording layer at a different depth in the optical disk than said first recording layer and compatible with a second format different from the first format;

a first substrate having a surface on which the first recording layer is formed;

a second substrate having a surface on which the second recording layer is formed;

a connection layer to connect the first and second substrates to each other;

a selective reflection layer formed adjacent to the first recording layer, and having a high reflectance for a first light of a first wavelength used to reproduce data stored in the first recording layer and a high absorptance for second light of a second wavelength used to reproduce data stored in the second recording layer; and a semi-transmission layer formed between the second recording layer and the connection layer, and having a high transmittance for the first light and a reflectance according to the second format.

\* \* \* \* \*